Aug. 7, 1956     J. H. SCHMID     2,757,802
STACKED DISCS STRAINER ASSEMBLY
Filed Jan. 10, 1952     2 Sheets-Sheet 1

INVENTOR.
JOHN H. SCHMID
BY
Florian J. Miller
Atty

Aug. 7, 1956    J. H. SCHMID    2,757,802
STACKED DISCS STRAINER ASSEMBLY
Filed Jan. 10, 1952    2 Sheets-Sheet 2

INVENTOR.
JOHN H. SCHMID
BY
Florian J. Miller
Atty.

United States Patent Office 2,757,802
Patented Aug. 7, 1956

2,757,802

STACKED DISCS STRAINER ASSEMBLY

John H. Schmid, Erie, Pa., assignor to J. A. Zurn Mfg. Co., Erie, Pa., a corporation of Pennsylvania Application January 10, 1952, Serial No. 265,901

6 Claims. (Cl. 210—169)

This invention relates generally to strainers and more particularly to an easily removable strainer basket assembly having an extremely large area for straining or filtering fluid.

In strainers built according to the teachings of the prior art, a cylindrical strainer basket is placed in the path of the flow of fluid in a strainer housing between the inlet and the outlet which gives only a limited amount of area for straining undesirable matter from the fluid with the result that the flow of fluid through the strainer is restricted, much of the undesirable matter passes through the strainer housing, and only a comparatively small amount of matter can be removed from the fluid. Strainers heretofore have not been capable of providing an extremely large open area ratio for straining which is often necessary, such as when fine particles are to be strained from the fluid passing through the strainer.

It is, accordingly, an object of my invention to provide a strainer assembly which is simple in construction, economical in cost, economical in manufacture, and efficient in operation.

Another object of my invention is to provide a compact straining member with an unusually large open area ratio for straining particles from the fluid passing therethrough.

Another object of my invention is to provide a compact straining member which can be easily removed from a strainer body and which can readily be assembled and disassembled for cleaning.

Another object of my invention is to provide a compact straining member which may be utilized in strainer bodies now on the market and in use.

Other objects of my invention will become evident from the following detailed description, taken in conjunction with the accompanying drawings, in which Fig. 1 is a vertical sectional view of my novel strainer assembly;

Figure 1:
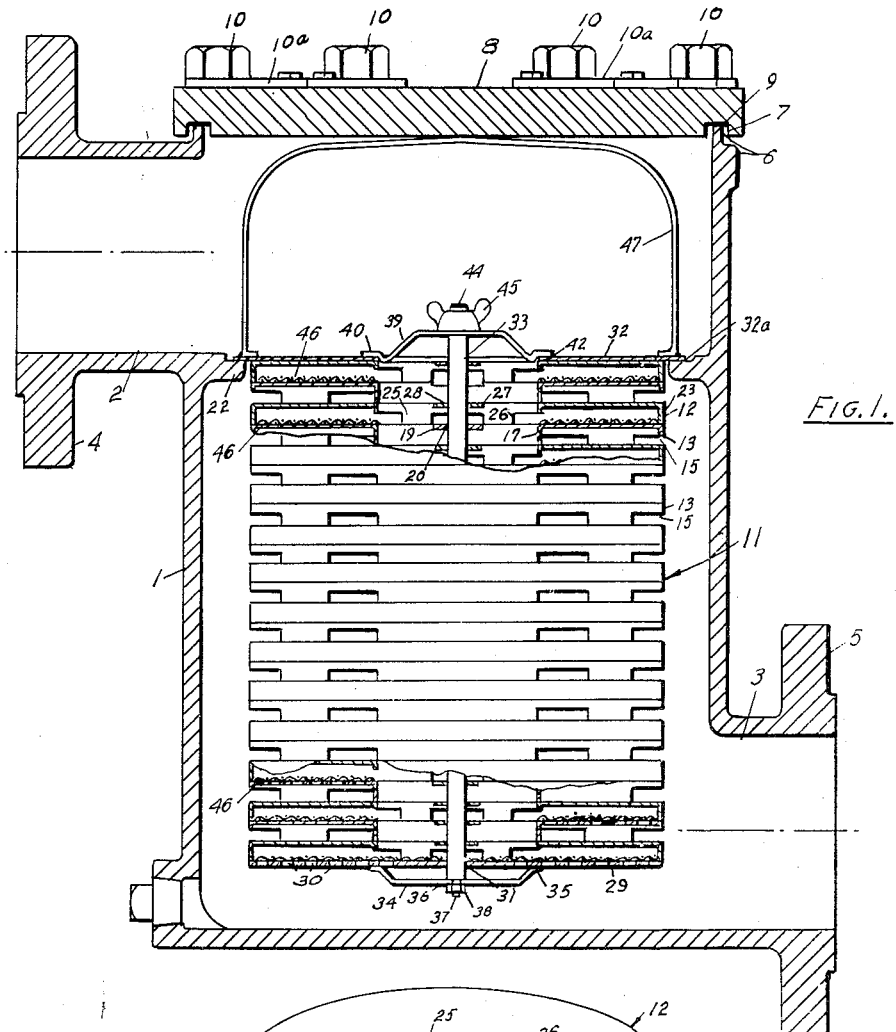
Figure 2:
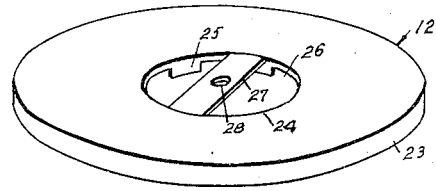
Fig. 2 is a perspective view of one form of strainer member in the strainer assembly shown in Fig. 1.
Figure 3:
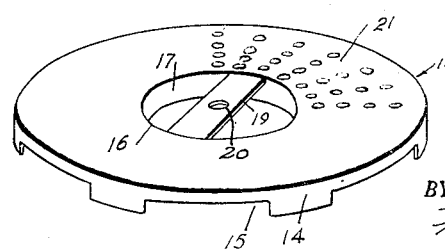
Fig. 3 is a perspective view of another form of strainer member in the strainer assembly shown in Fig. 1.

Referring now to the drawings, I show in Figs. 1, 2, and 3 a cylindrical housing 1 having a laterally extending inlet 2 in the upper side thereof and a laterally extending outlet 3 in the lower opposite side thereof, the inlet 2 and outlet 3 being connected by flanged connections 4 and 5 of conventional construction for connection to conventional flanged pipes lines. The upper end of the housing 1 is open and it defines an upwardly extending, circular seat 6 which nests in a peripheral groove 7 on the under side of a cap 8, a sealing washer or gasket 9 being disposed between the seat 6 of the housing 1 and the bottom of the groove 7 in the cap 8.

The cap 8 is secured to the upper end of the housing 1 by screw bolts 10 and C-washers 10a.

Now coming to the gist of my invention, I show a strainer assembly 11 comprising a plurality of intermediate, juxtaposed strainer plates or members 12 and 13 shown particularly in Figs. 2 and 3. Strainer members 13 shown in Fig. 3 each have an outer margin 14 thereof flanged at right angles thereto with spaced, circumferential recesses 15 cut therefrom. Each member 13 has perforations 21 for straining matter from fluid and an aperture 16 centrally thereof with a downwardly extending, inner marginal flange 17. A diagonal strap 19 having a central aperture 20 is disposed diametrically across the central aperture 16. Straining members 12 shown in Fig. 2 are of the same diameter as the members 13 and are of substantially the same construction as the members 13 shown in Fig. 3 except that each straining member 12 has a solid, downwardly extending, outer marginal flange 23 and a central aperture 24 with a depending flange 25 with spaced circumferential recesses 26. The aperture 24 has a cross strap 27 with a central aperture 28 disposed diametrically across the aperture 24. The outer flanges 14 and 23 on the straining members 13 and 12, respectively, are preferably slightly tapered so that one nests upon the other when in a juxtaposed position. A flat bottom plate 29 is disposed on the bottom of the assembly 11 and it has perforations 30 corresponding to the pattern of the perforations 21 in the members 13. The bottom plate 29 also has a central aperture 31. The top member 12 in the assembly 11 has a circular plate 32 secured to the top thereof having a margin 32a thereof extending outwardly from the outer side of the top member 12 for seating on an inwardly directed flange 22 in the housing 1 substantially in horizontal alignment with the bottom of the inlet aperture 2. The perforated bottom plate 29 and the intermediate members 12 and 13 are assembled together on a shaft 33 extending vertically through the apertures 20, 28, and 31 in the members 12 and 13 and the bottom plate 29, respectively. A spring member 34 with offset ends 35 engages the bottom plate 29 and it has a central aperture 36 through which extends the reduced threaded bottom end 37 of the shaft 33. A nut 38 threadably engages the threaded reduced end 37 of the shaft 33 to secure the spring member 34 thereon. A spring member 39 with offset outer ends 40 thereof engages the top plate 32 on the top member 12 in the assembly 11 and the margin of the aperture 42 in the plate 32, the spring member 39 having an aperture through which extends the threaded upper end 44 of the shaft 33. A wing nut 45 threadably engages the threaded upper end 44 of the shaft 33 and urges the spring member 39 against the plate 32. Upon rotation of the wing nut 45, the straining members 12 and 13 and bottom plate 29 are drawn and secured together.

Wire mesh circular screens 46 may be disposed on each of the intermediate plates 12 and 13 for better straining of the material or for the straining of finer material if this is desired. A looped handle 47 is secured in an upright position on the top plate 32 and the upper side thereof is engaged by the under side of the cap 8 to hold the outer marginal portion 32a of the plate 32 securely on the flanged portion 22 of the housing 1.

In the operation of my novel straining assembly, fluid to be filtered or strained enters the inlet 2 of the housing 1 and it passes through the central aperture 42 of the top plate 32 whereupon it flows downwardly and laterally outwardly through the recesses 26 in the central flanges 25 of alternate straining members 12 in the assembly 11. After passing through the recesses 26 in the flanges 25 in the members 12, the fluid passes outwardly in a downward direction through the perforated portions of straining members 13 and laterally outwardly through the circumferentially spaced recesses 15 in the outer flanges 14 of the straining members 13 whereby the strained fluid passes to the bottom of the housing 1 and outwardly through the outlet 3 thereof. The fluid to be strained passing outwardly through the recesses 26 in the flanges 25 in the lowermost member 13 in the assembly 11 passes through the perforations 30 in the bottom plate 29. After an excess amount of strained material is disposed in the strainer assembly 11, the cap 8 is removed whereby the strainer assembly 11 is lifted from the housing 1 and the plates 12, 13, and 29 are separated by merely turning the wing nut 45. After the plates 12, 13, and 29 have been cleaned, they are again assembled on the shaft 33 and secured thereto between the spring members 34 and 39 by the wing nut 45 engaging the threaded end 44 of the shaft 33.

Figure 4:
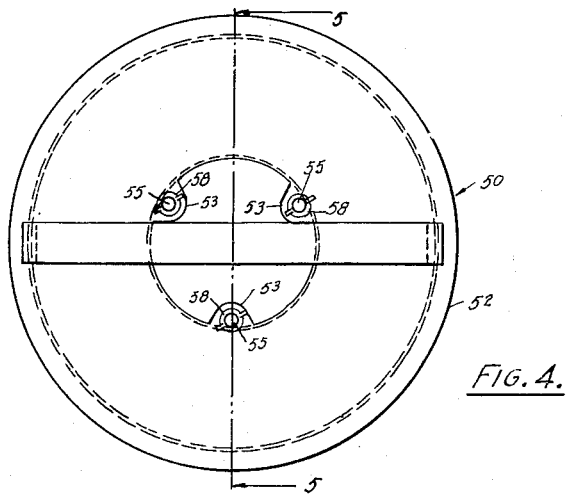
Fig. 4 is a plan view of a modified form of my novel strainer assembly.
Figure 5:
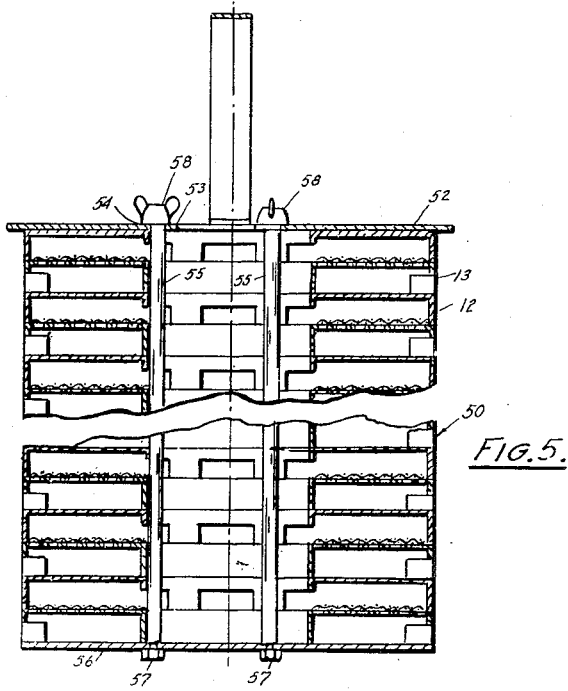
Fig. 5 is a view taken on the line 5—5 of Fig. 4.

Figs. 4 and 5 show a strainer assembly 50 the same as the strainer assembly 11 shown in Fig. 1 except for the means of securing the assembly together. The straining members 12 and 13 are identically the same as the straining members 12 and 13 heretofore described except that the cross straps 19 and 27 are eliminated. A top plate 52 has radially, inwardly extending lugs 53 with apertures 54 through which extend shafts 55. A bottom plate 56 has apertures for receiving the lower ends of the shafts 55. Both ends of the shafts 55 are threaded and threadably engage threaded members 57 and 58 which engage the bottom plate 56 and the top plate 52, respectively, to draw and secure the top plate 52, straining members 12 and 13, and the bottom plate 56 together. The operation of this modification of my strainer assembly is the same as that described for the strainer assembly shown in Fig. 1. Inasmuch as the straining members 12 and 13 nest upon each other, cross straps 19 and 27 may be eliminated from the straining members 12 and 13 shown in Figs. 1, 2, and 3.

It will be evident that for a given area, my novel strainer assembly has a maximum open area ratio to provide a straining surface for a maximum amount of fluid so as to remove substantially all of the solid material from a fluid and it will further be evident that my novel compact unit may be readily assembled and disassembled and removed as a unit from the housing 1 for cleaning.

Various changes may be made in the specific embodiment of my invention without departing from the spirit thereof or from the scope of the appended claims.

What I claim is:

1. A strainer for fluid comprising a housing having an inlet and an outlet and an inwardly directed flange, juxtaposed, plate members stacked one on top of the other, each having a central aperture, a central depending flange and an outer marginal depending flange, alternate plate members having perforations therethrough between the said flanges and having the outer flange thereof recessed and the inner flange solid and the other alternate plate members having the inner depending flange recessed for the passage of fluid and the outer flange solid, a top plate extending outwardly from the upper of said juxtaposed plate members seated on the inwardly directed flange in said housing, a perforated bottom plate on the bottom of said juxtaposed plate members, spring members engaging said top plate and said bottom plate, and a shaft connecting said spring members extending centrally of the central aperture of said juxtaposed plate members for securing said plate members, top plate, and bottom plate together.

2. A strainer as set forth in claim 1 wherein each of said plate members has a strap with a central aperture extending diametrically across the central apertures thereof, said shaft extending through the apertures in said straps.

3. A strainer as set forth in claim 1 wherein said top plate has an upwardly extending looped handle engageable by a cover on an open upper end of said housing to hold the outwardly extending flanged portion of said top plane on the inwardly directed flange of said housing.

4. A strainer comprising a housing having an inlet in the upper side thereof and an outlet, a strainer assembly between said inlet and outlet in said housing comprising a plurality of juxtaposed, centrally apertured, plates having inner and outer depending flanges, one set of plates of said assembly having perforations through the surface thereof between the flanges, the outer flanges thereof being recessed for the passage of fluid and the inner flanges solid and another set of plates of said assembly having the inner flanges thereof recessed for the passage of fluid and the outer flange solid, said sets of plates being alternately disposed relative to each other, a centrally apertured top plate, a perforated bottom plate, a shaft extending axially of the central aperture of said top plate, said intermediate plates, and through said bottom plate, spring members engaging said top and bottom plates connected by said shaft, and threaded members for securing said spring members into engagement with said top plate and said bottom plate to hold said juxtaposed plates together.

5. A strainer as set forth in claim 4 wherein a screen member is disposed between each of said juxtaposed plates.

6. A strainer as set forth in claim 4 wherein said plates have apertured straps extending across the central apertures thereof through which said shaft extends.

References Cited in the file of this patent

UNITED STATES PATENTS

| | | |
|---|---|---|
| 335,040 | Piefke | Jan. 26, 1886 |
| 658,573 | Murphy | Sept. 25, 1900 |
| 685,224 | Schmidt | Oct. 22, 1901 |
| 893,070 | Gobbi | July 14, 1908 |
| 1,564,666 | Griffin | Dec. 8, 1925 |
| 1,906,417 | Renfrew | May 2, 1933 |
| 2,278,453 | Kracklauer | Apr. 7, 1942 |
| 2,455,486 | Hicks | Dec. 7, 1948 |
| 2,602,548 | Griffiths | July 8, 1952 |
| 2,624,465 | Kracklauer | Jan. 6, 1953 |
| 2,646,126 | Goodner | July 21, 1953 |

FOREIGN PATENTS

| | | |
|---|---|---|
| 878,867 | France | Nov. 2, 1942 |